Jan. 17, 1950     L. H. MOOMAW     2,495,018
HINGED APERTURE GATE
Filed Oct. 17, 1946
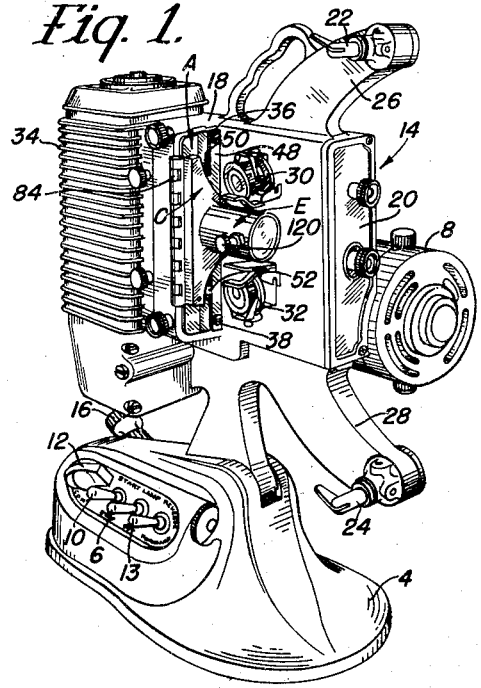
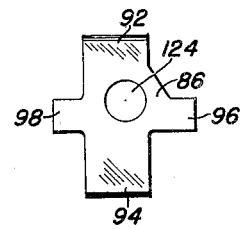
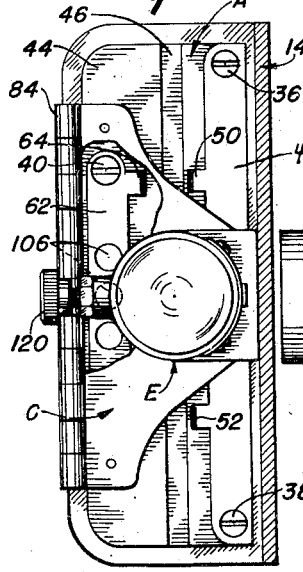
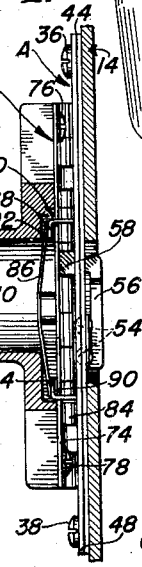
INVENTOR.
LEWIS H. MOOMAW Patented Jan. 17, 1950

2,495,018

UNITED STATES PATENT OFFICE 2,495,018

HINGED APERTURE GATE

Lewis H. Moomaw, Great Neck, N. Y., assignor to De Jur-Amsco Corporation, Long Island City, N. Y., a corporation of New York Application October 17, 1946, Serial No. 703,806

3 Claims. (Cl. 88—17)

The present invention relates to motion picture projectors and to a novel design of hinged aperture gate therefor.

In the projection of motion pictures it is essential that each frame of the motion picture film be individually and for a finite period of time projected by the motion picture apparatus onto the projection screen. To this end, it is essential that the illumination from the light source be restricted, when it passes through the film, to an area closely equivalent to the area of a single frame thereof. This is accomplished by providing an aperture gate which will pass light only over such an area, through or over which gate the film is adapted to slide, during projection, while pressed closely against the light aperture in that gate. A pressure plate is a common component part of such an assembly. It is also common in many conventional aperture gates to have part of the gate hinged with reference to other parts thereof.

It is an object of the present invention to provide an aperture gate in which the light aperture through which light passes for projection purposes can be made readily accessible for cleaning purposes. This is an important feature because any foreign matter which may be lodged within the light aperture will be projected onto the screen in greatly magnified form, thus materially interfering with visibility of the projected image.

It is still another object of the present invention to provide an aperture gate of a design such that film may be conveniently threaded therethrough and yet, when the gate is in its operating or closed position, be maintained in pressed and slidable relation with the light aperture.

It is a further object of the present invention to combine with the movable part of the aperture gate the lens assembly containing the lenses for focusing and directing the light which passes through the film, thus forming a compact and easily adjusted part of the motion picture projector.

The above objects are accomplished, generally speaking, by providing a hinged-type aperture gate in which the pressure plate is mounted on the movable part thereof.

To the accomplishment of the foregoing objects and such other objects as may hereinafter appear, my invention relates to the construction of a hinged-type aperture gate for a motion picture projector as sought to be defined in the appended claims and as described in the specification taken in connection with the drawings, in which:

Fig. 1 is a perspective view of a motion picture projector embodying my invention;

Fig. 2 is a detailed perspective view of the hinged aperture gate in opened position;

Fig. 3 is a front view, with a part thereof broken away, of the aperture gate in closed position;

Fig. 4 is a side view thereof, partially cross-sectioned; and

Fig. 5 is a front view of one embodiment of the pressure plate spring of my invention.

The aperture gate of my invention comprises a stationary inner part, generally designated A, containing a light aperture, generally designated B, and a movable outer part, generally designated C, having mounted thereon a pressure plate, generally designated D, and also having a light aperture B' therein.

When the movable part C is in its open position as shown in Fig. 2, the stationary part A, the light aperture B therein, the pressure plate D and the light aperture B' therein are all exposed for cleaning purposes and the film 2 may be properly positioned so as to be movable past the light aperture B without having to be threaded or inserted into a relatively inaccessible portion of the projector, as is the case with other projectors. When the movable part C is in its closed position as shown in Figs. 1, 3 and 4, the film 2 is maintained in pressed and slidable relation with respect to the light apertures B and B' past which it may be moved for projection in any conventional manner.

The movable part C is preferably attached to the lens receptacle, generally designated E, the two therefore being movable in unitary fashion in such manner that when the movable part C of the aperture gate is in its closed position the lens receptacle E is at the same time in position for projecting and focusing the images of the film 2 onto a projection screen.

I shall now describe my invention as embodied in a portable home motion picture projector. The drawings and the description relate specifically to a projector of my invention adapted to receive 8 millimeter film and hence of comparatively small size, but the principles above set forth may, of course, be employed in movie projectors of other sizes both portable and non-portable without departing from the spirit of my invention.

Features of my projector other than those here mentioned are described with particularity in my copending application Serial No. 703,805, filed on October 17, 1946, now Patent Number 2,440,966, issued May 4, 1948, relating to the novel ventilation system embodied therein, and in my other co-pending applications, Ser. No. 703,807, filed October 17, 1946, and Ser. No. 703,808, filed October 17, 1946, now Patent Number 2,468,993, issued May 3, 1949.

My projector comprises a base 4 in which is housed the various electrical control circuits for the projector, those circuits comprising an illumination circuit controlled by the switch 6, a start and stop circuit for the projector motor supported in motor housing 8, controlled by switch 10, a rheostatic circuit for control of motor speed controlled by rotary switch 12 and a reversing switch for the motor controlled by switch 13. The projector housing proper, generally designated 14, is mounted in the base 4 in such a manner as to be tiltable with respect thereto so as to control the position of the projected image, the knob 16 on the base 4 controlling the tilt.

The housing 14 comprises a motor housing 8 in which an electric motor is supported, a projection machinery housing 18, a gear box housing 20, a pair of reel supports 22 and 24 rotatably mounted at the extremities of the reel arms 26 and 28, conventional sprocket wheel assemblies 30 and 32 for guiding the film a lamp housing 34 in which is mounted a lamp (not shown) and my aperture gate.

The details of construction of my aperture gate are as follows: To the housing 14 is attached, by means of screws 36, 38, 40 and 42, an aperture plate 44 provided with a light aperture B and a vertical channel 46 in line therewith. The screws 36 and 38 additionally attach to the aperture plate 44 on one side thereof aligning plate 48 provided at appropriate positions therein with film guiding members 50 and 52. Attached to the underside of the aperture plate 44 by means of rivets 54 is an alignment spring 56, the active end 58 thereof projecting up through a suitable aperture 60 in the aperture plate 44 in such a manner as to bear against the edge of the film 2 as it passes over the aperture plate 44 and to press that film in a direction to the left, as viewed in Fig. 2.

The screws 40 and 42 additionally connect to the aperture plate 44 an alignment plate 62 which is appropriately provided at its inner edge with film guiding projections 64, 66 and 68. It will thus be seen that the active end 58 of the alignment spring 56 pushes the film 2 sidewardly into pressed and slidable relation with the guiding projections 64, 66 and 68, which projections in conjunction with projections 50 and 52 and the active end 58 of the spring 56 define a guiding channel for the film 2 so that the film will pass over the light aperture B in proper spatial relationship thereto.

The aperture plate is additionally orificed to permit projection claws 70 to engage with sprocket holes 72 in the side of the film in order to control in conventional fashion the sliding of the film 2 past the light aperture B.

The movable part C of the aperture gate comprises a plate 74 which is attached by means of screws 76, 78, 80 and 82 to the lens-mount assembly E and which is also attached by means of hinge 84 to the aperture plate 44. The pressure plate D is mounted thereon so as to be inwardly slidable with respect to the lens receptacle E but to be outwardly resiliently pressed with respect thereto by means of spring 86. The inwardly bent lips 88 and 90 of the pressure plate D serve both as bearing means against which the ends 92 and 94 of the spring 86 may act and also as retainers to prevent the pressure plate D from being pressed out of engagement with the plate 74. The ends 96 and 98 of the spring 86 (see Fig. 5) bear against portions of the interior of the lens receptacle E, which latter thus provides the rigid backing necessary for the resilient action of the spring 86.

The pressure plate D is provided with a light aperture B' adapted, when the aperture gate is in its closed position, to register and cooperate with the light aperture B in the plate 44. The pressure plate D is additionally orificed at 100 in order to provide clearance for the projection claws 70. Side notches 102 and 104 are adapted to receive, when the aperture gate is in its closed position, the guiding members 66 and 58, respectively, thus defining a film guiding passage open only at the axial ends thereof, that is to say, the top and bottom ends thereof, through which the film passes to slide past the light apertures B and B'.

When the aperture gate is in its closed position, the surface of the pressure plate D exposed in Fig. 2 will press against the film 2 in place on the plate 44, said pressure being exerted by the spring 86 on the pressure plate D, the pressure plate D being moved axially inwardly with respect to the lens receptacle E, as shown in Fig. 4. The pressure thus exerted is sufficient to maintain the film in pressed relation between the light apertures B and B' but is not so great as to interfere with the sliding of the film 2 past said apertures.

The aperture plate 44 and the alignment plate 62 as well as the housing 14 may be additionally orificed as at 106 for ventilation purposes as more specifically described in my aforementioned copending application.

In order to ensure proper positioning of the lens receptacle E, the plate 74 and the pressure plate D, when in closed position, the housing 14 is provided with a knob 108 adapted to be engaged by a fastening means 110 carried by the lens receptacle E. This fastening means comprises a pair of detents 112 spring-urged inwardly by springs 114 maintained in compression between the tops of detents 112 and plugs 116 carried by the lens receptacle E. In order to cushion the impact on the delicate lenses in the lens receptacle E when the hinged aperture gate is moved to its closed position, a spring stop 118 may be provided for engagement with the side of the projector housing 14. A knurled head screw 120 may serve both as a handle for the lens receptacle E and as a means to control the focusing of the optical system carried thereby.

In order to permit passage of light from the light apertures B and B' to the optical system in the lens receptacle E, the plate 74 and that part of the lens receptacle E to which it is attached are orificed as at 122 and the spring 86 is also orificed at 124.

By the above-described construction, I have provided a hinged-type aperture gate which is simple of construction and which additionally provides the following advantages:

(a) When the aperture gate is open, the light apertures B and B' are directly exposed, thus tremendously facilitating their cleaning.

(b) At the same time the path which the film must take in order to slide past the light apertures B and B' is made completely open, thus facilitating the placing of the film in its proper position on the projector for subsequent projection or its removal from the projector.

(c) When the aperture gate is in its closed position, and film is in the projector ready for projection, the pressure plate D resiliently maintains the film in pressed but slidable relation with respect to the light apertures B and B'.

(d) In conjunction with the film guiding projections 58 and 66 mounted on the aperture gate, the pressure plate D and the aperture plate 44 define the film guiding passage through which the film may pass and in which the film is maintained in proper spatial relationship to the light apertures B and B'.

(e) Since the movable part C of the aperture gate is mounted directly upon the lens receptacle E, when the former is in closed position the latter is necessarily in proper position for projection.

Other advantages will be apparent from the above detailed description of the projector. It will also be obvious that many changes may be made in the apparatus without departing from the spirit of the invention defined in the following claims.

I claim:

1. In a motion picture projector, a projector housing, an aperture plate mounted thereon and containing a light aperture past which film moves, guiding members on said plate for guiding the film past said aperture, said guiding members comprising a fixed member for guiding one side of said film, and a movable member for guiding the other side of said film, said movable member being spring biased toward said fixed member, a pressure element for maintaining the film in pressed and slidable relation to said aperture, said pressure element comprising a pressure plate having a face movable into parallel and pressed relationship with said light aperture over an area surrounding the same and having an aperture in said face registrable with said light aperture, and a lens receptacle, said pressure element being mounted in said lens receptacle at the end thereof adjacent to said aperture plate and having recesses for receiving said guiding members, said lens receptacle being hingedly mounted on said housing so as to be movable between a position in which the aperture and the film thereover are exposed and a position in which the pressure element bears against the film adjacent to the aperture and in which said guiding members are received within the recesses in said pressure element to define, over said aperture, a film guiding passage open only at the axial ends thereof.

2. In a motion picture projector, a projector housing, an aperture plate mounted thereon and containing a light aperture past which film moves, a lens receptacle articulately mounted on said housing so as to be movable between a closed position in which a first end of said receptacle overlies said aperture plate and an open position in which said receptacle exposed said aperture plate, said receptacle having a bore through which light will pass and a recess spaced radially beyond said bore at said first end of said receptacle, a second plate having an aperture fixedly secured to said first end of said receptacle, a spring secured between said second plate and said receptacle, said spring including a body substantially covering said bore and having an aperture in line with the aperture in said second plate, and a pressure plate having a face movable into parallel and pressed relationship with the film over an area surrounding the aperture in said aperture plate and having an aperture in its face registrable with said aperture, said pressure plate including portions projecting therefrom past said second plate into said receptacle and including angular retaining lips cooperable with said second plate so as to limit the outward spring-urged motion of said pressure plate, said spring being active on said projecting portions of said pressure plate to urge said pressure plate toward said aperture plate.

3. In a motion picture projector, a projector housing, an aperture plate mounted thereon and containing a light aperture past which film moves, a lens receptacle articulately mounted on said housing so as to be movable between a closed position in which a first end thereof overlies said aperture plate and an open position in which said receptacle exposes said aperture plate, said receptacle having a bore through which light will pass and a recess spaced radially beyond said bore at said first end of said receptacle, a second plate having an aperture fixedly secured to said first end of said receptacle, a spring secured between said second plate and said receptacle, said spring including a body substantially covering said bore and having an aperture in line with the aperture in said second plate and also having legs bearable against said receptacle in a part of said recess, and a pressure plate having a face movable into parallel and pressed relationship with the film over an area surrounding said aperture and having an aperture in its face registrable with said aperture, said pressure plate having portions projecting therefrom past said second plate into a part of said recess in said receptacle and including angular retaining lips cooperable with said second plate so as to limit the outward spring-urged motion of said pressure plate, said spring being active on said retaining lips to urge said pressure plate toward said aperture plate.

LEWIS H. MOOMAW.

REFERENCES CITED

The following references are of record in the file of this patent:

UNITED STATES PATENTS

| Number | Name | Date |
|---|---|---|
| 1,128,841 | Bohringer | Feb. 16, 1915 |
| 1,469,016 | King | Sept. 25, 1923 |
| 1,780,945 | Sapier | Nov. 11, 1930 |
| 1,815,486 | Serrurier | July 21, 1931 |
| 1,884,609 | Dina | Oct. 25, 1932 |
| 2,007,188 | Foster et al. | July 9, 1935 |
| 2,089,276 | Lindstrom et al. | Aug. 10, 1937 |
| 2,228,855 | Sperry | Jan. 14, 1941 |
| 2,232,811 | Sperry | Feb. 25, 1941 |
| 2,427,327 | Nemeth | Sept. 9, 1947 |

FOREIGN PATENTS

| Number | Country | Date |
|---|---|---|
| 235,992 | Great Britain | July 2, 1925 |
| 637,888 | Germany | Nov. 5, 1936 |